Oct. 2, 1962    J. J. COUZENS    3,056,611
FOOTREST FOR STROLLER
Filed June 26, 1961
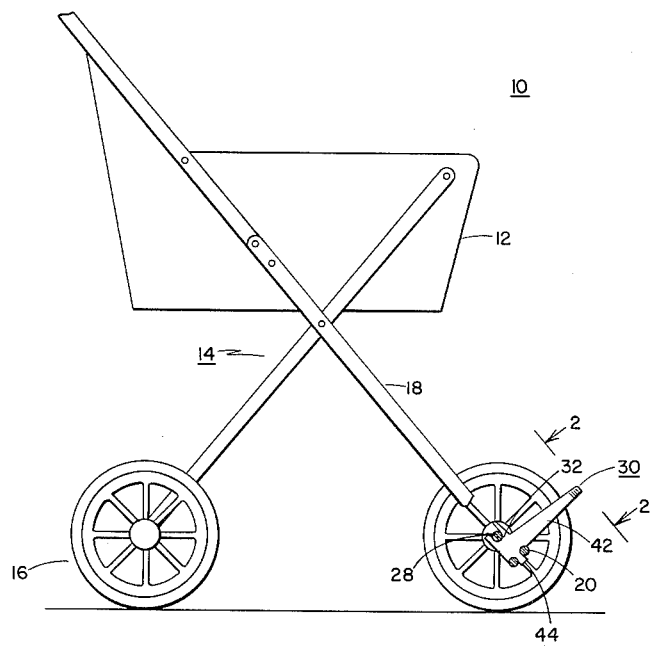
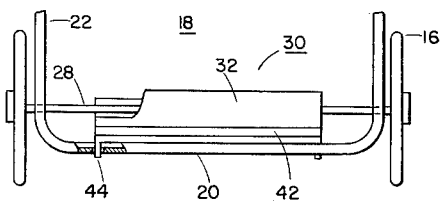
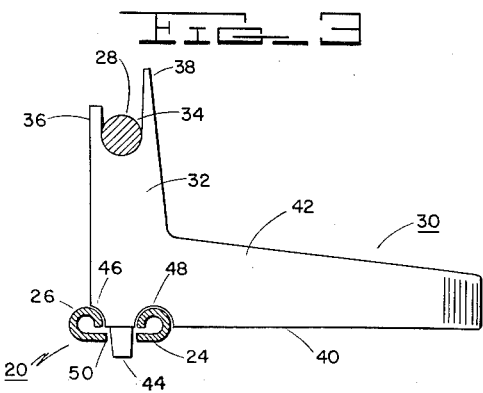
*INVENTOR.*
BY *Gust & Irish*
ATTORNEYS

United States Patent Office 3,056,611
Patented Oct. 2, 1962

3,056,611
FOOTREST FOR STROLLER
Joseph J. Couzens, Riverside, Ill., assignor to South Bend
Toy Manufacturing Company, Inc., South Bend, Ind.
Filed June 26, 1961, Ser. No. 119,650
4 Claims. (Cl. 280—47.38)

This invention relates generally to strollers, for both children and dolls, and more particularly to a footrest for such strollers.

In the design of strollers for small children, it is desirable to provide a footrest for supporting the feet of the child. In the case of doll strollers, it is obviously desirable closely to simulate the appearance of the real article. Since both types of strollers are generally low-cost items, it is desirable that such a footrest arrangement be characterized by its simplicity, ease of assembly, and low cost, however, the footrest must nevertheless be firmly secured to the stroller.

It is accordingly an object of my invention to provide an improved footrest construction for strollers.

Another object of my invention is to provide an improved footrest construction for strollers characterized by firm attachment to the stroller, simplicity, ease of assembly and relatively low cost.

Further objects and advantages of my invention will become apparent by reference to the following description and the accompanying drawings, and the features of novelty which characterize my invention will be pointed out with particularity in the claims annexed to and forming a part of this specification.

In accordance with the broader aspects of my invention, I provide a footrest arrangement for a stroller of the type incorporating a generally U-shaped frame element having a horizontally disposed bight portion with leg portions extending upwardly therefrom and with an axle for carrying wheels for the stroller in spaced parallel relationship with the bight portion and journaled in the leg portions, the bight portion having at least one aperture formed thereon. In accordance with my invention, I provide a footrest member having a portion resiliently engaging the axle and another portion projecting into the aperture in the bight portion, thereby removably securing the footrest member between the axle and the bight portion.

In the drawings:

FIG. 1 is a side view, partly in section and partly broken away, illustrating a stroller incorporating the improved footrest construction of my invention;

FIG. 2 is a fragmentary end view, partly in section and partly broken away, viewed generally along the line 2—2 of FIG. 1; and FIG. 3 is a fragmentary side view, partly in cross-section, further illustrating my improved footrest construction.

Referring now to the figures of the drawings, there is shown a stroller 10, which may be either a doll stroller or a life-size stroller for children, having a conventional fabric seat assembly 12 supported by a conventional scissors frame 14 which in turn is supported by wheels 16.

Frame 14 includes a forward U-shaped frame element 18 having a bight portion 20 and upstanding leg portions 22. As best seen in FIG. 3, U-shaped frame element 18 is formed of metal having a cross-sectional configuration with a flat center portion 24 and rolled edges 26 on the interior surfaces of the frame.

An elongated rod element 28 is provided serving as the axle for the front wheels 16, rod 28 being in spaced parallel relationship with bight portion 20 of frame element 14 and extending through suitable apertures in leg portions 22.

In accordance with my invention, I provide a footrest member 30, preferably formed of suitable molded plastic material and having a generally L-shaped cross-sectional configuration. Leg 32 of footrest 30 has an elongated, downwardly extending groove 34 formed in its top edge and parallel therewith, groove 34 defining a rear lip 36 and a forward lip 38. Inspection of FIG. 3 will clearly reveal that the forward lip 38 is higher than the rear lip 36.

The bottom surface 40 of the other leg 42 of footrest member 30 has a pair of projections 44 depending from its side edges, projections 44 being respectively in alignment with the leg 32 and the groove 34. Inspection of FIG. 3 will clearly reveal that the dimension between the ends of projections 44 and the bottom of groove 34 is greater than the normal dimension between rod 28 and center portion 24 of bight portion 20. The side edges of leg 42 of footrest member 30 also have notches 46 and 48 formed therein on either side of projections 44 respectively. The center portion 24 of leg portion 20 of the frame element 14 has a pair of apertures 50 formed therein spaced apart by a distance equal to the spacing of projections 44.

Rod 28 by virtue of its elongated configuration has some resilient properties which permit it to be deflected or distorted upwardly. In order to assemble the footrest member 30 on the stroller 10, rod 28 is seated in the groove 34 of footrest member 30, the rod 28 is distorted upwardly and the two projections 44 respectively snapped into the apertures 50. When the pressure on the rod 28 is released, rod 28 resiliently biases projections 44 into the apertures 50 and the notches 46 and 48 respectively into engagement with the rolled edges 26 of bight portion 20, as best seen in FIG. 3. It will be seen that with this arrangement, the leg 42 of footrest member 30 serves as the footrest and that the device is firmly yet removably secured between rod 28 and the bight portion 20.

It will now be seen that my improved footrest construction is characterized by its extreme simplicity, comprising only one additional molded plastic part, namely the footrest member 30 which is readily snapped into firm engagement with the rod 28 and the bight portion 20 of the frame element 18.

While I have illustrated and described a specific embodiment of my invention, further modifications and improvements will occur to those skilled in the art and I desire therefore in the appended claims to cover all modifications which do not depart from the spirit and scope of my invention.

What is claimed is:

1. In a stroller; a generally U-shaped frame element having a horizontally disposed bight portion with leg portions extending upwardly therefrom; an axle having resilient properties and for carrying wheels for said stroller, said axle being in spaced parallel relationship with said bight portion and being journaled in said leg portions, said bight portion having at least one aperture formed therein; and a footrest member having a portion with a groove formed therein resiliently engaging said axle, said portion having a projection formed thereon extending into said aperture thereby removably securing said footrest member between said axle and bight portion, the dimension between the end of said projection and the bottom of said groove being greater than the normal spacing between said axle and said bight portion.

2. In a stroller; a generally U-shaped frame element having a horizontally disposed bight portion with leg portions extending upwardly therefrom; an elongated rod having resilient properties and forming an axle for carrying wheels for said stroller, said rod being in spaced parallel relationship with said bight portion and being journaled in said leg portions, said bight portion having a plurality of spaced apertures formed therein; and a generally L-shaped footrest member, one leg of said footrest member having an elongated groove formed in its end, the other leg of said footrest member having a plurality of projections formed thereon in general alignment with said one leg and said groove, the dimension between the ends of said projections and the bottom of said groove being greater than the normal spacing between said rod and said bight portion, said projections being respectively seated in said apertures and said rod being seated in said groove and resiliently biasing said projections into said apertures thereby removably securing said footrest member between said rod and bight portion.

3. In a stroller; a generally U-shaped frame element having a horizontally disposed bight portion with leg portions extending upwardly therefrom; an elongated rod having resilient properties and forming an axle for carrying wheels for said stroller, said rod being in spaced parallel relationship with said bight portion and being journaled in said leg portions; said bight portion having two spaced apertures formed therein; and an elongated generally L-shaped footrest member, one leg of said footrest member having an elongated groove formed in its end and parallel therewith, said groove defining a front lip portion on the side of said one leg toward the end of the other leg and a back lip portion, said front lip portion being higher than said back lip portion, said footrest member having a pair of spaced projections formed on the side of its other leg remote from said groove, said projections being in general alignment with said one leg and said groove, the dimension between the ends of said projections and the bottom of said groove being greater than the normal spacing between said rod and said bight portion, said footrest member being positioned with said projections respectively seated in said apertures and with said rod seated in said groove and resiliently biasing said projections into said apertures thereby removably securing said footrest member between said rod and bight portion with said other leg extending outwardly therefrom to form a footrest.

4. In a stroller, a generally U-shaped frame element having a horizontally disposed bight portion with legs extending upwardly therefrom, said frame element in cross-section having a flat center portion with rolled side edges, said rolled edges being on the inner side of said frame element; an elongated rod having resilient properties and forming an axle for carrying wheels for said stroller, said rod being in spaced parallel relationship with said bight portion and having its ends respectively extending through apertures in said center portion of said frame legs; the center portion of said bight portion having two spaced apertures formed therein; and an elongated generally L-shaped footrest member formed of molded plastic material, one leg of said footrest member having an elongated groove formed in its end and parallel therewith, said groove defining a front lip portion on the side of said one leg toward the end of the other leg of said footrest member and a back lip portion, said front lip portion being higher than said back lip portion, said footrest member having a pair of projections depending from the side edges of its other leg, said projections being in general alignment with said one leg and said groove, said side edges of said other leg respectively having notches formed therein on either side of said projections, the dimensions between the ends of said projections and the bottom of said groove being greater than the normal spacing between said rod and said bight portion, said footrest member being positioned with said projections respectively seated in said bight portion apertures, with said rolled edges of said bight portion respectively seated in said notches, and with said rod seated in said groove and resiliently biasing said projections into said apertures and said notches into engagement with said rolled edges thereby securing said footrest member between said rod and bight portion with said other leg extending outwardly therefrom to form a footrest.

References Cited in the file of this patent
UNITED STATES PATENTS

| | | |
|---|---|---|
| 2,435,022 | Troendle | Jan. 27, 1948 |
| 2,573,106 | Macip | Oct. 30, 1951 |
| 2,712,451 | Welsh | July 5, 1955 |
| 2,751,232 | Sundberg | June 19, 1956 |
| 2,967,059 | Goldberg | Jan. 3, 1961 |